(12) United States Patent
Otosaka

(10) Patent No.: US 9,085,482 B2
(45) Date of Patent: Jul. 21, 2015

(54) GLASS BASE MATERIAL ELONGATING APPARATUS

(71) Applicant: Shin-Etsu Chemical Co., Ltd., Tokyo (JP)

(72) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 154 days.

(21) Appl. No.: 14/042,734

(22) Filed: Oct. 1, 2013

(65) Prior Publication Data

US 2014/0096566 A1    Apr. 10, 2014

(30) Foreign Application Priority Data

Oct. 5, 2012 (JP) .................... 2012-223166

(51) Int. Cl.
*C03B 37/03* (2006.01)
*C03B 37/012* (2006.01)

(52) U.S. Cl.
CPC ........... *C03B 37/032* (2013.01); *C03B 37/0126* (2013.01); *C03B 37/01257* (2013.01)

(58) Field of Classification Search
CPC ...................... C03B 37/0124; C03B 37/01242; C03B 37/01245; C03B 37/01257; C03B 37/0126; C03B 37/03; C03B 37/032; C03B 2205/80; C03B 2205/81
See application file for complete search history.

(56) References Cited

U.S. PATENT DOCUMENTS

2009/0038345 A1* 2/2009 Otosaka et al. ................. 65/424
2012/0222452 A1* 9/2012 Otosaka ......................... 65/402

FOREIGN PATENT DOCUMENTS

| JP | H09-030827 A | 2/1997 |
| JP | H11-060259 A | 3/1999 |
| JP | 2005-104763 A | 4/2005 |
| JP | 2011-116592 A | 6/2011 |

OTHER PUBLICATIONS

JP11-060259 Machine Translation Performed JPO website Apr. 29, 2015.*

* cited by examiner

*Primary Examiner* — Lisa Herring

(57) ABSTRACT

In order to provide a glass base material elongating apparatus that can safely elongate a glass base material in an extendable top chamber without damaging a flange, provided is a glass base material elongating apparatus comprising a heating furnace; an extendable top chamber formed of a multilayer cylinder disposed above the heating furnace; a glass base material hanging mechanism that hangs a glass base material into the heating furnace and the extendable top chamber; and a top chamber lifting mechanism. A flange is formed on a top portion of an outermost tube of the multilayer cylinder, and the top chamber lifting mechanism includes a cylinder support member that supports the flange from below and a cylinder lifting member that lifts up the cylinder support member.

6 Claims, 8 Drawing Sheets

GLASS BASE MATERIAL ELONGATING APPARATUS

BACKGROUND

1. Technical Field

The present invention relates to an elongating apparatus for a glass base material such as an optical fiber preform that includes a top chamber made of an extendable multilayer cylinder.

2. Related Art

An optical fiber preform (glass rod) serving as the material for optical fiber is manufactured by being heated and elongated from a large glass base material for use as an optical fiber. As an example of a glass base material elongating apparatus, Japanese Patent Application Publication No. H11-060259 discloses an elongating apparatus that has an extendable top chamber. According to the method described in Japanese Patent Application Publication No. H11-060259, the overall height of the elongating apparatus is kept low by using the extendable top chamber, and therefore a miniaturized elongating apparatus can be used for a large base material.

Furthermore, Japanese Patent Application Publication No. 2011-116592 discloses an elongating apparatus with a top chamber made of glass. According to Japanese Patent Application Publication No. 2011-116592, the heat accumulated in the tapered portion at the top of the glass base material can be restricted by using the glass top chamber, thereby improving the outer diameter control during the latter half of the elongation. Japanese Patent Application Publication No. 2011-116592 describes using a single glass tube as the top chamber, and Japanese Patent Application Publication No. H11-060259 describes using a multilayer cylinder that can extend as the top chamber.

In order to decrease curvature in a glass rod obtained through elongation, Japanese Patent Application Publication No. H09-030827 and Japanese Patent Application Publication No. 2005-104763 describe methods for holding the glass base material at a constant XY position during elongation.

In an elongating apparatus with an extendable top chamber, it would be possible to use a splicing fitting to fix the top lid and the flange provided on the top of the extendable top chamber. However, since there is little distance between the heating furnace and the top lid and flange during the latter portion of the elongation, the top lid becomes warped due to the high temperature and the flange can break or cause friction, resulting in damage.

SUMMARY

Provided is a glass base material elongating apparatus comprising a heating furnace; an extendable top chamber formed of a multilayer cylinder disposed above the heating furnace; a glass base material hanging mechanism that hangs a glass base material into the heating furnace and the extendable top chamber; and a top chamber lifting mechanism. A flange is formed on a top portion of an outermost tube of the multilayer cylinder, and the top chamber lifting mechanism includes a cylinder support member that supports the flange from below and a cylinder lifting member that lifts up the cylinder support member.

The summary clause does not necessarily describe all necessary features of the embodiments of the present invention. The present invention may also be a sub-combination of the features described above.

DESCRIPTION OF EXEMPLARY EMBODIMENTS

Figure 1:
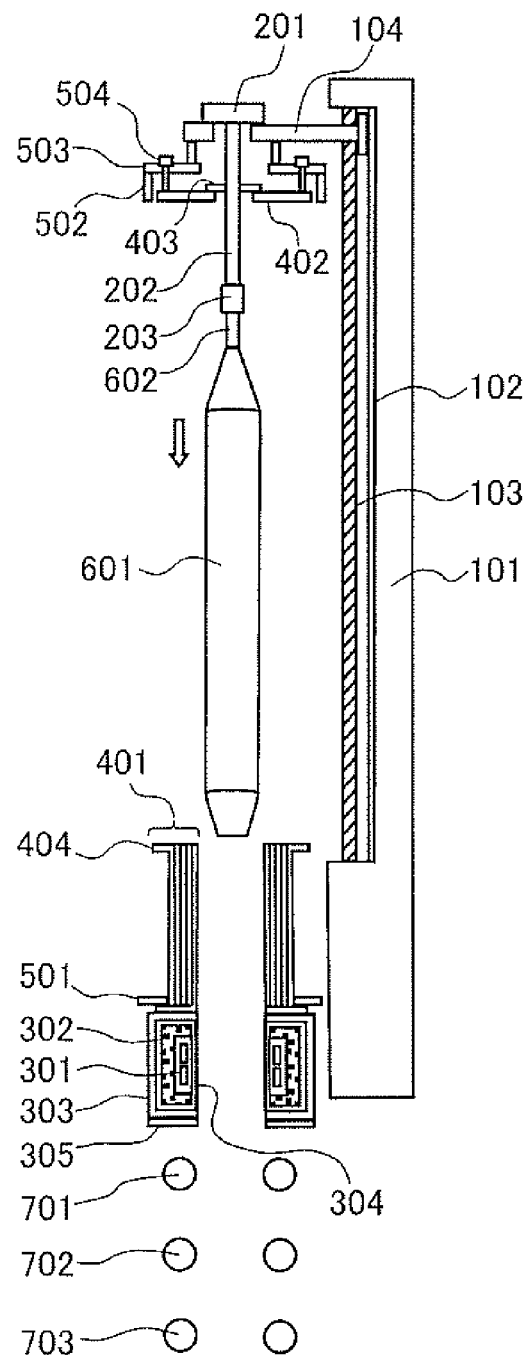
FIG. 1 shows a state in which the glass base material is attached to the glass base material elongating apparatus according to the present embodiment.

Hereinafter, an embodiment of the present invention will be described, but the embodiment does not limit the invention. FIGS. 1 to 4 show an exemplary glass base material elongating apparatus according to the present embodiment. The major portions of the elongating apparatus are the raising/lowering mechanism (reference numerals in the 100s), the glass base material hanging mechanism (reference numerals in the 200s), the heating furnace (reference numerals in the 300s), the extendable top chamber (reference numerals in the 400s), the top chamber lifting mechanism (reference numerals in the 500s), and the pulling mechanism (reference numerals in the 700s). Here, a glass base material workpiece (reference numerals in the 600s) is mounted.

As shown in FIG. 1, the raising/lowering mechanism raises and lowers a carriage 104 using a ball screw 103 and a guide rail 102 attached to a column 101. The hanging shaft 202 and the hanging shaft tube 203 are connected to the carriage 104 as the glass base material hanging mechanism, and the glass base material 601 is suspended from a hanging shaft tube 203 via a dummy rod 602. An XY table 201 is disposed at the top end of the hanging shaft 202, thereby enabling adjustment of the horizontal position of the glass base material.

The heating furnace is arranged below the raising/lowering mechanism, and is formed of a carbon heater 301, a carbon thermal insulator 302, a water-cooled main chamber 303, a carbon muffle tube 304 for distancing the glass base material from debris generated by the heater and the thermal insulator, a shutter 305 that can adjust the opening diameter to prevent atmosphere from entering from the outside, and an electrode and inert gas inlet that are not shown.

Figure 2:
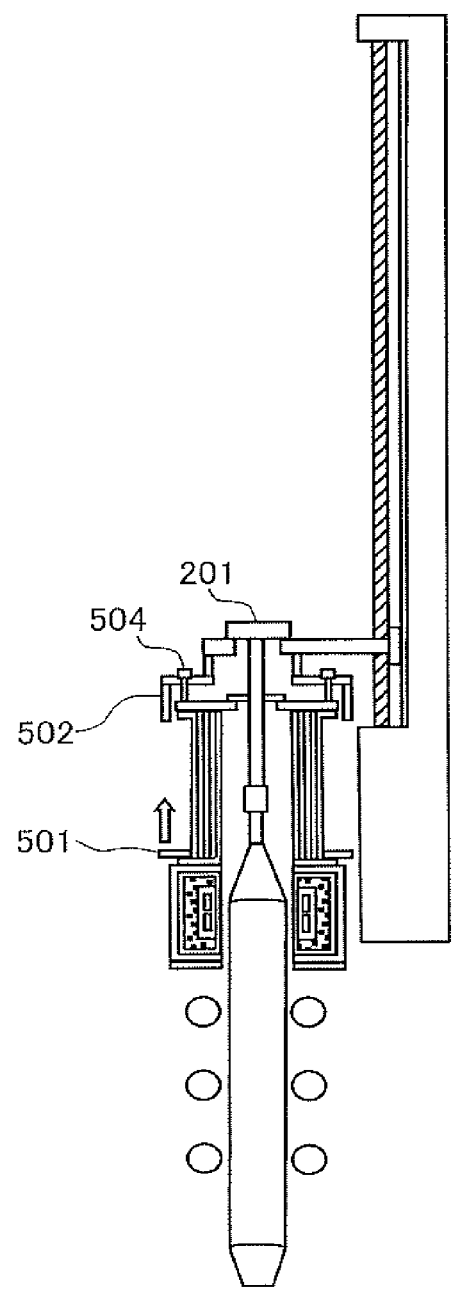
FIG. 2 shows a state in which the glass base material hanging mechanism is lowered.
Figure 3:
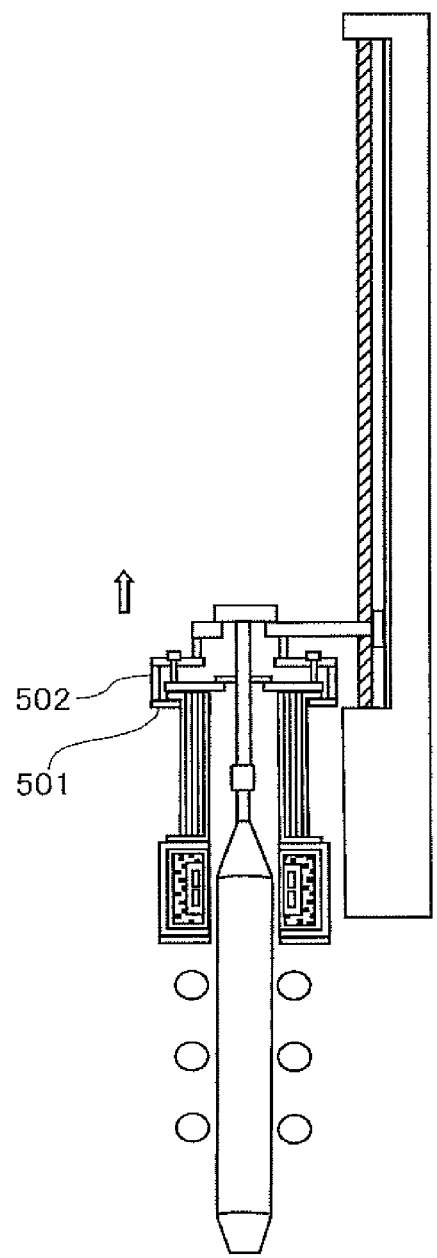
FIG. 3 shows a state in which the extendable top chamber is combined with the glass base material hanging mechanism.
Figure 4:
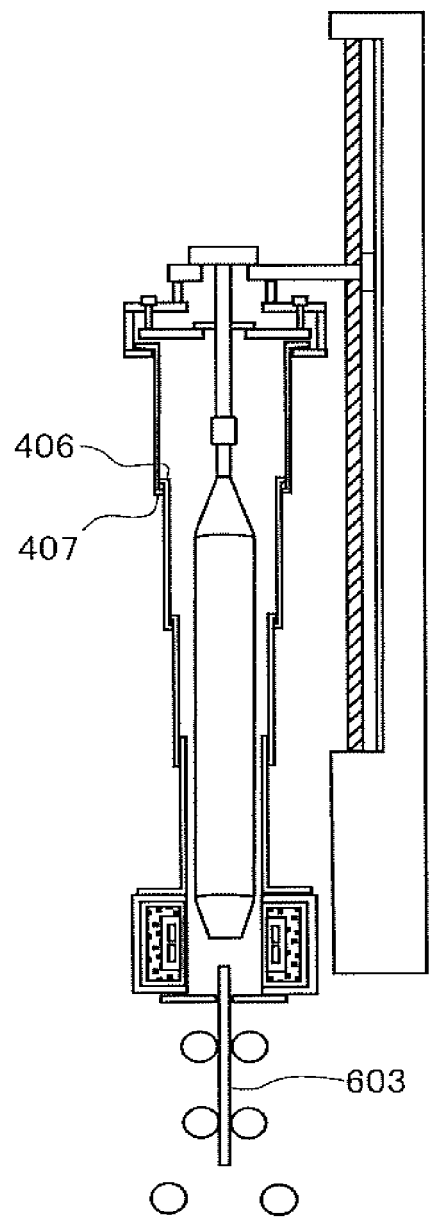
FIG. 4 shows a state in which the cylinder is extended.
Figure 5:
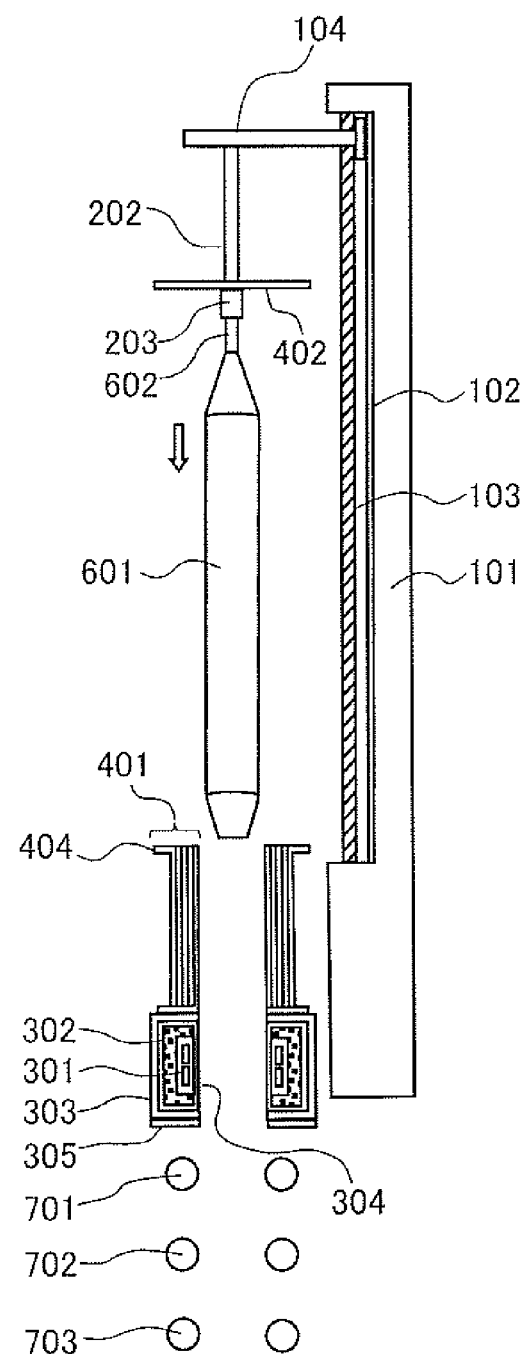
FIG. 5 shows a state in which the glass base material is attached to the glass base material elongating apparatus of the comparative example.
Figure 6:
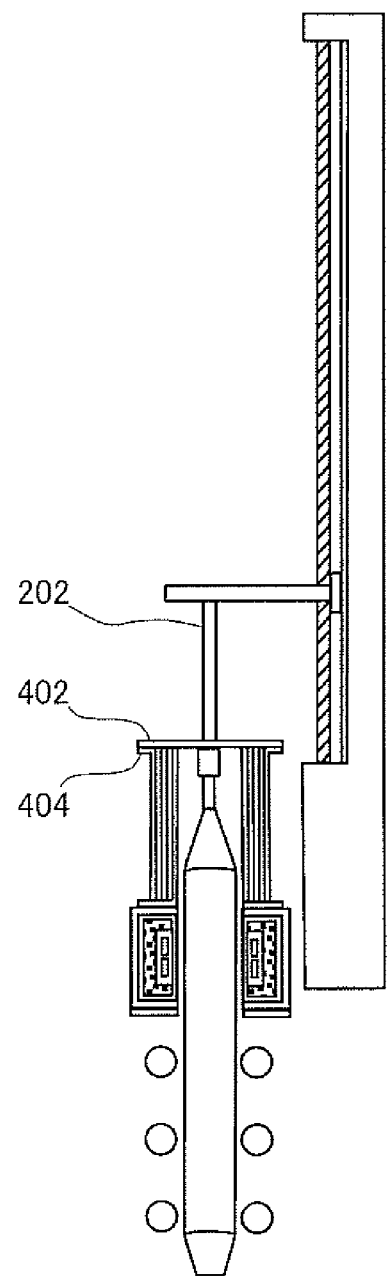
FIG. 6 shows a state in which the hanging shaft tube is lowered.

The extendable top chamber formed of a multilayer glass cylinder 401 is connected to the top portion of the heating furnace, and a flange 404 is provided on the top portion of the outermost tube of the multilayer glass cylinder 401. A glass cylinder lifting member 503 is attached to the carriage, and a plurality of support columns 502 oriented downward are attached to the outer periphery of the glass cylinder lifting member 503. As shown in FIGS. 2 and 3, by connecting the support columns 502 and the glass cylinder support member 501 arranged below the flange 404 using a splicing fitting such as a bolt and nut, the bottom surface of the flange 404 can be held up by the glass cylinder support member 501. Each glass cylinder forming the multilayer glass cylinder has an outer claw 406 attached to the top portion thereof and an inner claw 407 attached to the bottom portion thereof. By raising the raising/lowering mechanism, the outer claw 406 moves onto the inner claw 407 such that the cylinder extends, such as shown in FIG. 4.

The top lid 402 is suspended from the glass cylinder lifting member 503 via a top lid hanging jig 504. The inner diameter of the top lid 402 is larger than the outer diameter of the hanging shaft 202, to ensure the drive amount in the horizontal direction of the hanging shaft 202. In order to prevent air from entering into and furnace gas from leaking out of the gaps between the top lid 402 and the hanging shaft 202, a gas seal plate 403 having an inner diameter slightly larger than the outer diameter of the hanging shaft 202 is placed on the top lid 402, thereby realizing drive in the horizontal direction of the glass base material without damaging the gas sealing ability.

As made clear from FIG. 1, the top lid 402 is merely placed on the flange 404, and no securing force other than the weight of the top lid 402 itself is applied. Therefore, since large forces such as warping of metal portions do not act on the top lid 402 or the flange 404, damage to the top lid 402 and the flange 404 can be avoided. Furthermore, by using material with good thermal resistance and shape stability at high temperature, such as quartz glass, for the top lid 402, oxidation damage of the carbon muffle tube 304 can be prevented since there are no gaps between the top lid 402 and the flange 404 even when the temperature is increased.

The pulling mechanism is formed by guide rollers 701 that can grip and release while freely rotating and upper pulling rollers 702 and lower pulling rollers 703 that can grip and release while rotating according to a motor. As shown in FIG. 4, the bottom end of the glass base material 601 is heated in the heating furnace, and after the pulling dummy 603 has been fused thereto, the pulling dummy 603 or elongated glass rod is pulled down by the pulling mechanism while being lowered by the raising/lowering mechanism, thereby enabling the glass base material to be elongated into a glass rod with a desired outer diameter.

As a comparative example, FIGS. 5 to 8 are used to describe an elongating apparatus that uses an extendable multilayer glass cylinder top chamber. FIGS. 5 to 8 show the attachment of the glass base material 601, the combination of the glass base material hanging mechanism and the extendable top chamber, and the fusing of the pulling dummy 603. The major portions of the elongating apparatus are the raising/lowering mechanism (reference numerals in the 100s), the glass base material hanging mechanism (reference numerals in the 200s), the heating furnace (reference numerals in the 300s), the extendable top chamber (reference numerals in the 400s), and the pulling mechanism (reference numerals in the 700s). Here, a glass base material workpiece (reference numerals in the 600s) is mounted.

The raising/lowering mechanism raises and lowers a carriage 104 using a ball screw 103 and a guide rail 102 attached to a column 101. The hanging shaft 202 and the hanging shaft tube 203 are connected to the carriage 104 as the glass base material hanging mechanism, and the glass base material 601 is suspended from a hanging shaft tube 203 via a dummy rod 602.

The heating furnace is arranged below the raising/lowering mechanism, and is formed of a carbon heater 301, a carbon thermal insulator 302, a water-cooled main chamber 303, a carbon muffle tube 304 for distancing the glass base material 601 from debris generated by the heater 301 and the thermal insulator 302, a shutter 305 that can adjust the opening diameter to prevent atmosphere from entering from the outside, and an electrode and inert gas inlet that are not shown.

Figure 7:
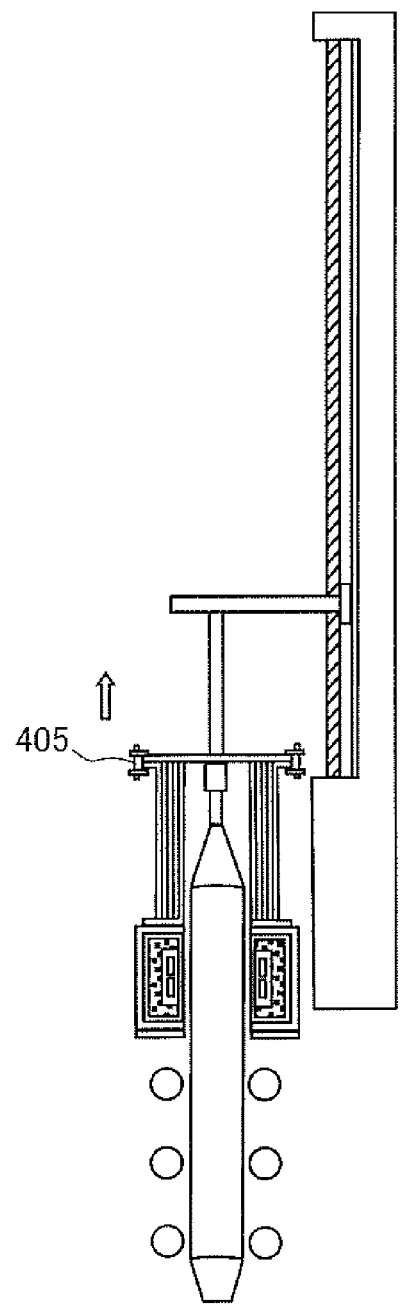
FIG. 7 shows a state in which the top lid and the extendable top chamber are connected by the splicing fitting.
Figure 8:
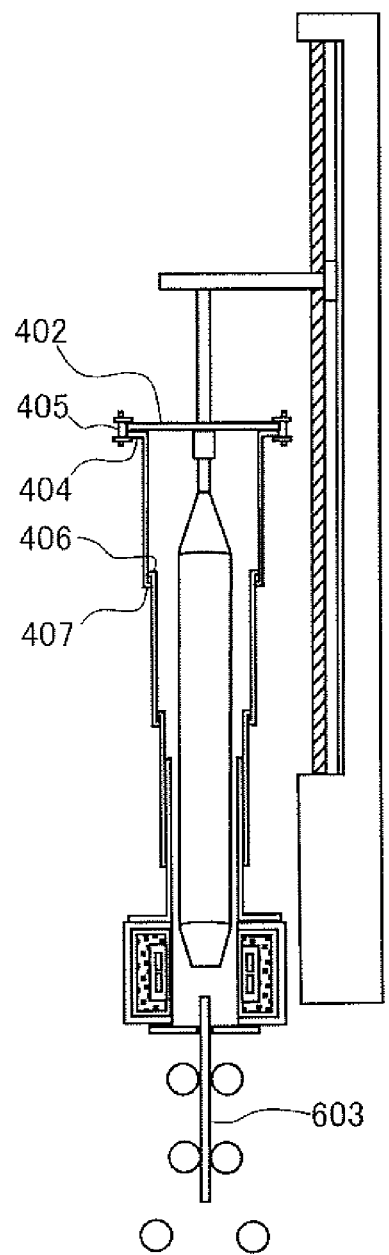
FIG. 8 shows a state in which the cylinder is extended.

The extendable top chamber formed of a multilayer glass cylinder 401 is connected to the top portion of the heating furnace. A flange 404 is provided on the top portion of the outermost tube of the multilayer glass cylinder 401, and a top lid 402 is placed on the top of the hanging shaft tube 203 (see FIG. 5). When the glass base material 601 is lowered, the top lid 402 is placed on the flange 404 (FIG. 6), and then connected by the splicing fitting 405 (FIG. 7). Each glass cylinder forming the multilayer glass cylinder 401 has an outer claw 406 attached to the top portion thereof and an inner claw 407 attached to the bottom portion thereof. By raising the raising/lowering mechanism, the outer claw 406 moves onto the inner claw 407 such that the cylinder extends, such as shown in FIG. 8.

The pulling mechanism is formed by guide rollers 701 that can grip and release while freely rotating and upper pulling rollers 702 and lower pulling rollers 703 that can grip and release while rotating according to a motor. As shown in FIG. 8, the bottom end of the glass base material 601 is heated in the heating furnace, and after the pulling dummy 603 has been fused thereto, the pulling dummy 603 or elongated glass rod is pulled down by the pulling mechanism while being lowered by the raising/lowering mechanism, thereby enabling the glass base material 601 to be elongated into a glass rod with a desired outer diameter.

As the elongation progresses, the extendable top chamber contracts. When the top chamber is completely contracted, the distance between the top lid 402 and the heating furnace is small, and the top lid 402 and the splicing fitting 405 are at a high temperature. Since the top lid 402 supports the weight of the extendable top chamber, the top lid 402 is preferably formed using metal instead of a brittle material such as glass or ceramic.

However, if such material is used, the top portion becomes warped at high temperatures, and this results in damage from the stress on the flange 404.

Furthermore, if the attachment by the splicing fitting 405 is weak, gaps occur between the top lid 402 and the flange 404. As a result, the internal gas in the heating furnace that has been lightened by the heating rises upward and escapes, and external atmosphere enters from the bottom of the heating furnace to replace this escaped gas, thereby causing oxidation damage to the carbon muffle tube 304.

In contrast, the glass base material elongating apparatus according to the present embodiment includes an extendable top chamber formed of a multilayer glass cylinder 401 that houses the glass base material and a top chamber support mechanism formed of the cylinder support member 501 that supports from below the flange 404 provided on the top of the outermost tube in the multilayer glass cylinder 401 and the glass cylinder lifting member 503 that lifts up the cylinder support member. Therefore, the flange 404 of the multilayer glass cylinder 401 is supported from below without being secured to the top lid 402. As a result, damage to the flange 404 caused by warping due to heat of a metal portion can be prevented. Furthermore, gaps between the top lid 402 and the flange 404 can be prevented, and therefore the possibility of the carbon muffle tube 304 being damaged is prevented.

Furthermore, a material that does not substantially deform due to heat, such as quartz glass, is used for the top lid. As a result, deformation due to heat and the resulting gaps between the flange 404 and the top lid 402 can be restricted.

Yet further, the XY table 201 is provided in the glass base material hanging mechanism and the gas seal plate 403 that is slideable in the XY direction is provided on the top of the top lid. Therefore, the glass base material can be driven horizontally independently of the extendable top chamber, thereby decreasing curvature of the elongated glass rod. In addition, since the glass base material hanging mechanism and top chamber lifting mechanism are attached to a single carriage 104 instead of the top chamber lifting mechanism being provided independently, the configuration of the apparatus is simplified and the cost of the apparatus can be decreased.

While the embodiment of the present invention has been described, the technical scope of the invention is not limited to the above described embodiment. It is apparent to persons skilled in the art that various alterations and improvements can be added to the above-described embodiment. It is also apparent from the scope of the claims that the embodiments added with such alterations or improvements can be included in the technical scope of the invention.

LIST OF REFERENCE NUMERALS

101: column, 102: guide rail, 103: ball screw, 104: carriage, 201: XY table, 202: hanging shaft, 203: hanging shaft tube, 301: heater, 302: thermal insulator, 303: main chamber, 304: carbon muffle tube, 305: shutter, 401: multilayer glass cylinder, 402: top lid, 403: gas seal plate, 404: flange, 405: splicing fitting, 406: outer claw, 407: inner claw, 501: cylinder support member, 502: support column, 503: glass cylinder lifting member, 504: top lid hanging jig, 601: glass base material, 602: dummy rod, 603: pulling dummy, 701: guide roller, 702: upper pulling roller, 703: lower pulling roller

What is claimed is:

1. A glass base material elongating apparatus comprising:
    a heating furnace;
    an extendable top chamber formed of a multilayer cylinder disposed above the heating furnace;
    a glass base material hanging mechanism that hangs a glass base material into the heating furnace and the extendable top chamber; and
    a top chamber lifting mechanism, wherein
    a flange is formed on a top portion of an outermost tube of the multilayer cylinder, and
    the top chamber lifting mechanism includes a cylinder support member that supports the flange from below and a cylinder lifting member that lifts up the cylinder support member.

2. The glass base material elongating apparatus according to claim 1, wherein
    a top lid is placed on top of the multilayer cylinder without being secured to the multilayer cylinder.

3. The glass base material elongating apparatus according to claim 1, wherein
    the multilayer cylinder is made of glass.

4. The glass base material elongating apparatus according to claim 1, wherein
    the multilayer cylinder is air-tight.

5. The glass base material elongating apparatus according to claim 2, wherein
    the glass base material hanging mechanism includes an XY table, and
    a gas seal plate that is slideable in the XY direction is included on top of the top lid.

6. The glass base material elongating apparatus according to claim 1, wherein
    the glass base material hanging mechanism and the top chamber lifting mechanism are attached to a single carriage.

\* \* \* \* \*